2,910,514
PRODUCTION OF DURENE FROM FRACTIONS CONTAINING POLYALKYL BENZENES HAVING 9 TO 10 CARBON ATOMS PER MOLECULE

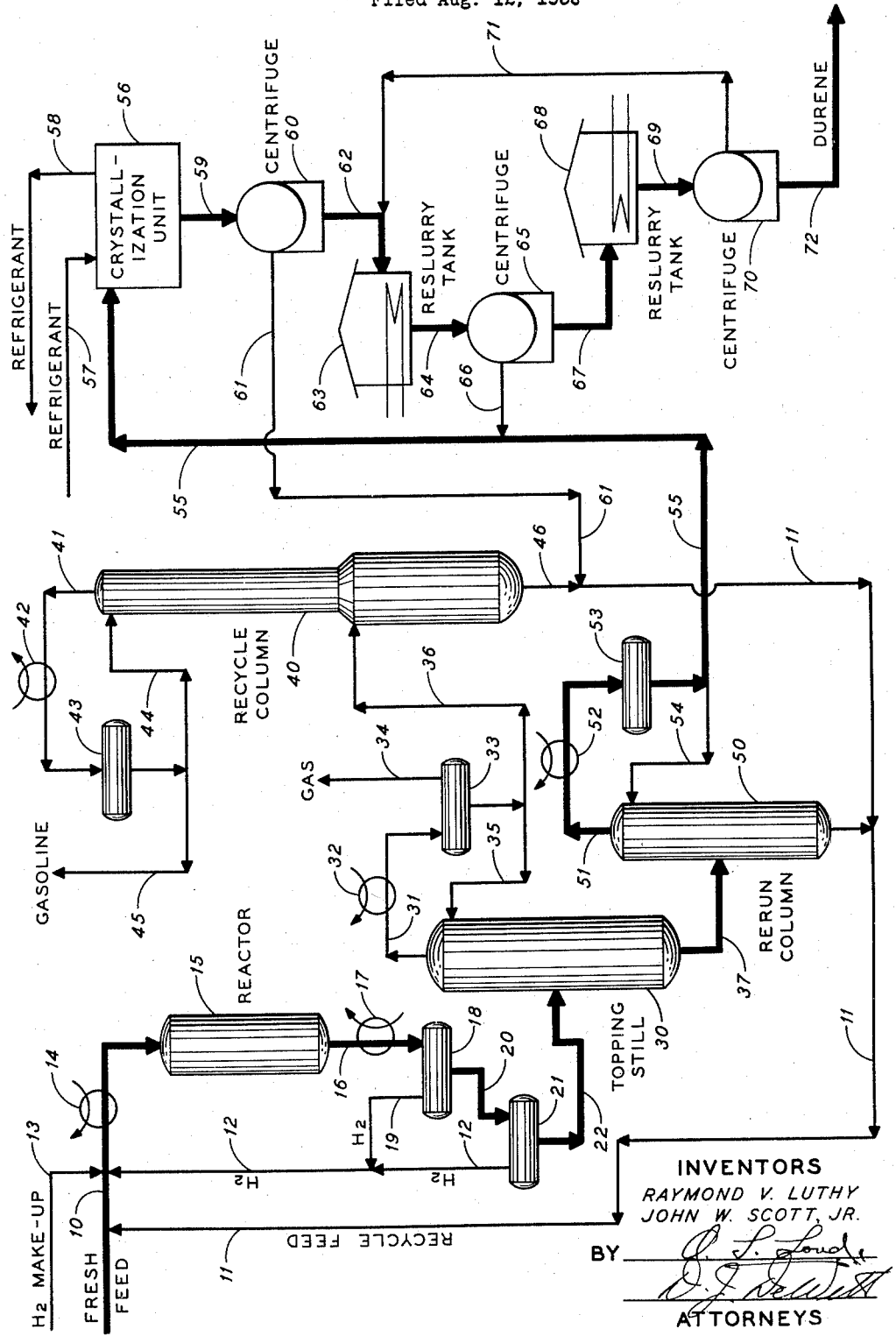

John W. Scott, Jr., Ross, and Raymond V. Luthy, Berkeley, Calif., assignors to California Research Corporation, San Francisco, Calif., a corporation of Delaware Application August 12, 1955, Serial No. 528,086

9 Claims. (Cl. 260—671)

This invention relates to a process for the catalytic conversion of hydrocarbons and particularly polyalkyl aromatics of the type present in various petroleum refinery streams. More especially, it relates to the preparation of durene and other alkyl substituted aromatic compounds by a process of catalytic disproportionation.

In the processing of petroleum fractions in a refinery, various product streams are obtained which contain polyalkyl-substituted aromatic hydrocarbons. Representative refinery streams of this character which can be employed in a practice of this invention are those produced in catalytic reforming and hydrofining operations and to a lesser extent in catalytic cracking, as well as the extracts obtained by the solvent treatment or extractive distillation of various product or feed streams with selective solvents such as furfural, phenol, liquid sulfur dioxide, nitrobenzene or the like. Other suitable streams are those produced in connection with processes involving alkylation of aromatics. Generally such streams, in addition to a non-aromatic fraction, comprise complex mixtures of various compounds such as xylenes, trimethyl and higher polymethyl benzenes, polyethyl benzenes, ethyl toluenes and ethyl xylenes, and polypropyl and polybutyl benzenes as well as the analogous polynuclear derivatives such as polymethyl naphthalenes and anthracenes. Particularly suitable feed streams for use in the present invention are fractions containing polyalkylated benzenes containing from 9 to 10 carbon atoms in the molecule as obtained from the effluent streams produced in the catalytic reforming of light and/or heavy naphthas as in the various platforming or other catalytic reforming units. Such fractions can be used either per se, or in the form of various concentrates thereof, and are referred to herein as catalytic reformate fractions.

The present invention, while broadly directed to the catalytic conversion of the foregoing and other compounds present in the feed stream, is particularly concerned with reactions whereby as large a proportion as possible of the feed stream components is converted to durene, and with means for thereafter recovering said durene as well as the other products formed during the conversion reaction.

Durene (1,2,4,5-tetramethylbenzene) is a chemical which is of particular utility as an intermediate in preparing various plastics, resins, synthetic filaments and other products. Methods for recovering durene from hydrocarbon mixtures have already been developed and are described, for example, in U.S. Patents 2,560,373 to Schmidl and 2,625,555 to Miller, the separation processes there are set forth being applied, inter alia, to streams which, though somewhat enriched in durene content by a prior aromatization treatment, still contain but a relatively small amount of the desired component, usually in the order of about one percent. Further, the refinery streams heretofore processed to recover durene, while containing lighter and relatively desirable gasoline components, have also contained appreciable amounts of materials boiling above durene, which materials, though only of marginal utility as gasoline components, have nevertheless required extended processing in order to extract the durene component, thereby greatly increasing the cost of the operation without offering the offsetting credit as a gasoline blending stock which exists in the case of the lighter components. It is an object of this invention to overcome the deficiencies of the prior art methods by providing a unitary process which not only converts a substantial percentage of suitable polyalkyl aromatic feed components to durene or other desired aromatic products (predominantly by reactions of disproportionation), but which also converts high boiling fractions in the feed to lower boiling materials having excellent utility either as gasoline blending stocks or as precursors for the durene or other desired aromatic products when recycled to the reaction zone. A further object is to provide an efficient process for the catalytic disproportionation of polyalkyl aromatic components of refinery streams, and particularly of pseudocumene and other trimethyl benzenes to durene, said reaction being characterized by the substantial absence of coke deposits on the catalyst and by little degradation of feed components to normally gaseous products boiling below the gasoline range. Still a further object is to provide a unitary operation whereby trimethyl benzenes and other polyalkyl aromatics in the hydrocarbon feed stream are substantially entirely converted to durene and products boiling in the gasoline range, and for thereafter recovering said durene in a high state of purity while also recovering the desired gasoline components constituting essentially the remainder of the product stream from the operation. The nature of other objects will be apparent from a consideration of the descriptive portion to follow.

In accordance with this invention, it has been found that the foregoing objects can be attained by passing the charging stock containing the desired polyalkyl aromatic components, along with added hydrogen in the amount of from about 1000 to 10,000 s.c.f. per barrel of feed stock, through a reaction zone provided with a catalyst comprising a hydrogenating-dehydrogenating component such as molybdenum oxide deposited on a silica-alumina or other support having active cracking characteristics, at temperatures between about 650 and 850° F., pressures above 300 p.s.i.g. and space rates of from about 0.5 to 15 v./v./hr. During the ensuing reaction, disproportionation occurs in considerable measure, especially among the polyalkyl-substituted benzenes wherein the alkyl substituent groups each contain from one to three carbon atoms. Further, any higher boiling components (i.e., those boiling above about 350° F.) fed to the reaction zone or formed therein during the disproportionation reaction are at least partially converted to lower boiling products, this with little loss to less valuable, normally gaseous materials. This conversion of higher boiling components becomes complete when, in accordance with the preferred practice of this invention, any such unconverted, heavier components in the effluent from the disproportionation reaction zone are continuously recycled to said zone. More specifically, the reaction of the present invention, in addition to being one of disproportionation, also involves isomerization and cracking and is accompanied by appreciable consumption of hydrogen (normally from about 300 to 1500 s.c.f. per barrel of feed), the hydrogenating activity under the reaction conditions employed being sufficient to promote hydrocracking of the longer ($C_{3+}$) alkyl side chains from aromatic nuclei, but insufficient to promote any appreciable ring hydrogenation except in the case of the more fully substituted nuclei resulting from the disproportionation reaction, particularly the penta- and hexaalkyl-substituted benzenes, which are cracked to desirable isoparaffinic materials boiling in the lower portion of the gasoline range.

Following the conversion reaction set forth above, the reaction product is freed of lighter, normally gaseous components (including a hydrogen-rich stream which is preferably recycled to the reactor) and then is distilled to recover various product fractions. The latter are processed to separate the durene, or other desired aromatic compounds, both from the lighter materials which are then sent to gasoline storage and/or returned to the reaction zone for further conversion to said desired aromatic compound, as well as from the heavier components which are also preferably recycled to the reactor for further conversion. By operating in this fashion, it is readily possible to practice a continuous operation (employing, for example, a heavy naphtha reformate boiling between about 300 and 500° F., or a $C_9$ concentrate therefrom) wherein the products comprise durene in relatively pure form, a light gasoline fraction boiling below 350° F. and a very small percentage (normally below 5%) of $C_3$ and lighter gases. The activity of the catalyst remains high over weeks and even months of continuous operation, with over-all conversions normally falling in the range of from about 25 to 60% during the entire reaction period. The catalyst is then capable of being regenerated by conventional burning techniques, whereupon it is ready for reuse for another extended operating period, the cycle of conversion and regeneration being continued indefinitely.

While additional data will be given below in the examples, it may be noted that by feeding a $C_9$ aromatic concentrate (boiling from about 320 to 350° F.) obtained after removing the xylenes and light aromatics, as well as the nonaromatics, from a light naphtha reformate, which concentrate was made up of 74% pseudocumene, 8% ethyl toluene, 12% mesitylene and 6% hemimellitene, it is possible to obtain a product (in 98% liquid yield), containing 9.8% of $C_7$ components, 26% of $C_8$ components, 41.3% of $C_9$ components, 19.7% $C_{10}$ components and but 3% of $C_{11}$ and higher components, with durene constituting 6% by volume of the total reactor effluent, this data being obtained on a once-through basis and without recycle. When recycle operation is employed with the same $C_9$ concentrate, it is possible to obtain, as product, approximately 35 or more parts of durene and 60 parts of a liquid gasoline fraction boiling below 250° F. for each 100 parts by volume of feed concentrate employed, the balance being lighter gases.

The catalyst employed in the isomerization-cracking zone is one wherein a material having hydrogenating-dehydrogenating activity is deposited or otherwise disposed on an active cracking catalyst support. The cracking component may comprise any one or more of such acidic materials as silica-alumina, silica-magnesia, silica-alumina-zirconia composites, as well as various clays. The hydrogenating-dehydrogenating component of the catalyst can be selected from any one or more of the various group VI and group VIII metals, as well as the oxides and sulfides thereof, representative materials being the oxides and sulfides of molybdenum, tungsten, vanadium, chromium and the like, as well as metals such as iron, nickel, cobalt and platinum and various oxides thereof. If desired, more than one hydrogenating-dehydrogenating component can be present, and good results have been obtained with catalysts containing molybdenum oxide along with cobalt oxide; with composites of the oxides of cobalt and chromium, nickel and chromium, chromium and zinc; and with mixtures of various oxides of molybdenum, chorimum and zinc, along with fluorine. The amount of the hydrogenating-dehydrogenating component present can be varied within relatively wide limits of from about 0.1 to 15%, based on the weight of the entire catalyst. However, as indicated above, the amount of this material present should be sufficient to give the catalyst a mild hydrogenating activity such that the catalyst is capable of promoting hydrocracking of paraffins and the longer alkyl side chains from aromatic nuclei and to promote some hydrocracking of highly substituted aromatics formed by disproportionating, but is insufficient to promote substantial ring hydrogenation under the reaction conditions employed in the isomerization-cracking zone. Particularly good results have been obtained with catalysts wherein from 1% to 12% molybdenum oxide, or a mixture of from 1 to 12% molybdenum oxide and from 0.1 to 5% cobalt oxide, is deposited on an active cracking support made up of silica-alumina, e.g., TCC beads as marketed by Socony Mobil Oil Company, Inc. This catalyst can be readily prepared by soaking the beads in a solution of ammonium molybdate, drying the catalyst for 24 hours at 200° F., and then calcining the dried material for 10 hours at 1000° F. Thereafter any cobalt employed can be introduced in similar manner and the catalyst dried and finished with another calcining step. Under favorable operation conditions the isomerization-cracking catalyst will maintain high activity, with per pass conversions of from about 25 to 70% over periods of several hundred hours. However, when activity is depleted, the activity is restored by a conventional regeneration treatment, involving burning off catalyst contaminants with an oxygen-containing gas.

Having selected or prepared the (low nitrogen) feed stock to be employed, as well as the catalyst, the present process is effected by preheating the feed to a temperature between about 650 and 850° F., along with an amount of from about 1000 to 10,000 standard cubic feet (s.c.f.) of hydrogen per barrel of feed, and passing the resulting heated vaporous mixture, under a pressure of at least 300 p.s.i.g., through the catalyst at a v./v./hr. of from about 0.5 to 15. Preferably, the feed is heated to a temperature of from about 725 to 825° F. and is passed at a pressure in the range of from about 600 to 3000 p.s.i.g. through the catalyst at a v./v./hr. of from about 0.75 to 3. It has been found that as temperatures much below about 650° F. are employed in the reaction zone, the per pass conversions in said zone fall to uneconomic levels, whereas if resort is had to temperatures materially above 850° F. (i.e., those of from about 875 to 900° F.) the conversion to $C_4$ and normally gaseous materials is greatly increased, thus lowering the yield of the desired gasoline and disproportionation products. Further, operation at temperatures above about 850° F. induces a relatively rapid decrease in the activity of the catalyst as reflected in reduced per pass conversion levels. This is costly, since it increases the required regeneration frequency.

On leaving the reaction zone, the effluent stream is first freed of hydrogen and similar light gases and is thereafter subjected to one or more distillation operations to recover a fraction rich in durene or the other desired aromatic compound produced in the disproportionating reaction, as well as the desired gasoline fraction or fractions, and those fractions, if any, which are to be recycled to the reaction zone. These recycle streams normally comprise heavier components which are to be converted to lower boiling products on further reaction, as well as lighter streams containing stocks suitable as precursors for conversion to durene or other aromatic products by disproportionation. More particularly, when durene is the aromatic product to be recovered, a $C_{10}$ fraction is obtained from which the durene is thereafter separated in known manner, preferably by a chilling operation as disclosed, for example, in U.S. Patent No. 2,625,555 to Miller. Reference is made to said patent for a more detailed disclosure of the durene separation methods as well as for equivalent methods, involving the use of selective solvents, azeotropic agents and the like, for obtaining the desired aromatic concentrates from the reactor effluent.

It is considered that the various features of the present invention, including those relating to the recovery of durene and to the recycle of appropriate heavy and/or precursor stocks to the reaction zone, will be evident from a consideration of the following examples and the figure of the appended drawing which is a simplified flow scheme of a refinery unit suitable for use in producing durene and a high grade of gasoline by a practice of this invention. For the sake of greater clarity, this figure is described below in connection with Example I, which (along with the other examples) illustrates the invention in various of its embodiments.

EXAMPLE I

In this operation, which is directed toward maximum production of durene, there is supplied through line 10 as fresh feed to the unit of the drawing, at a rate of 1000 bbl./day, a $C_9$ aromatic concentrate as obtained from a catalytic reformate, said concentrate having the following approximate composition:

| | Percent |
|---|---|
| Ethyl toluene | 8 |
| Mesitylene | 12 |
| Pseudocumene | 74 |
| Hemimellitene | 6 |

The above fresh feed, along with 14,073 barrels per day of recycle feed from line 11 and a total of approximately 5700 s.c.f. $H_2$ per barrel of total fresh and recycle feeds (including recycle hydrogent from line 12 and make-up hydrogen from line 13 supplied in the amount of approximately 600 s.c.f. $H_2$ per barrel of fresh feed) is heated to approximately 800° F. by passage through heat exchanger 14. The resulting heated vaporous effluent is passed at a rate of 2 v./v./hr. and a pressure of 1200 p.s.i.g. through reactor 15 provided with a catalyst made up of molybdenum oxide (1% by weight as Mo) deposited on a synthetic silica-alumina gel cracking support (TCC beads containing approximately 87% silica, 13% alumina). The effluent stream from reactor 15 is passed through line 16 and condenser 17 into a gas-liquid separator 18 from which a gas stream made up essentially of hydrogen is taken through line 19 for recycle to reactor 15. A liquid phase is withdrawn from separator 18 and passed through line 20 into a gas-liquid separator 21 operated at reduced pressures (50 p.s.i.g.), from which a hydrogen-rich recycle stream is also recovered through line 12.

The liquid stream from separator 21 is then fed through line 22 into a topping still 30 where the stream is distilled to recover an overhead fraction containing $C_9$ and lower components, and a bottoms stream containing the durene and other $C_{10}$ as well as heavier components. The overhead fraction from still 30 is taken through line 31 and condenser 32 to a gas-liquid separator 33 (operated at essentially atmospheric pressure) from which a gaseous stream, useful for fuel purposes, is recovered through line 34, while the liquid product is in part returned to the column as reflux (reflux ratio, 1.5 to 1) via line 35, with the remainder being sent through line 36 to recycle column 40.

The recycle column 40 is operated under such conditions as to take overhead the desired gasoline fraction, which may include only $C_6$ and lighter fractions (as here), or also $C_7$, $C_8$ or even a minor portion of the $C_9$ fractions, as desired. However, for optimum durene production, this overhead gasoline fraction will preferably contain only $C_7$ or lighter components. Whatever the nature of the overhead, the same is taken through line 41 and condenser 42 into reflux drum 43, from which a portion of the condensate is returned to the column as reflux (reflux ratio 5 to 1) through line 44 while the balance (approximately 596 barrels per day) is withdrawn through line 45 for use as a gasoline blending stock. This product makes an excellent gasoline component due to its low end point and good lead susceptibility and sensitivity, its characteristics in the latter respects being superior not only to those of the feed supplied to line 10, but also to those of any corresponding fraction normally obtained from catalytic reformates. The bottoms from column 40, comprising in the main $C_7$–$C_9$ materials, are withdrawn at a rate of approximately 11,562 bbl./day for recycle to the reactor 15 through lines 46 and 11.

The durene-containing bottoms fraction from still 30 is introduced through line 37 to a rerun column 50 from which the durene-containing $C_{10}$ fraction is taken overhead through line 51 and condenser 52 to a reflux drum 53 from which the condensate is in part returned as reflux (reflux ratio, 1 to 1) through line 54, with the balance being sent via line 55 to crystallization unit 56. The bottoms from column 50, containing the $C_{11}$ and higher fractions, are withdrawn at a rate of approximately 384 bbl./day for recycle to reactor 15 through line 11.

In the crystallization unit 56, the incoming feed stream from line 55 is cooled (as by use of a refrigerant provided through lines 57 and 58) to a temperature sufficiently low to effect crystallization of an appreciable portion of the durene. While this temperature will vary with durene concentration and other factors, in the present example the stream is cooled to a temperature of −20° F. The resulting slurry is then passed through line 59 to centrifuge 60 wherein the durene-containing crystals are separated from the mother liquor which is recycled through lines 61, 46 and 11 to the reactor 15 at a rate of approximately 2127 bbl./day. The crystalline mass recovered from centrifuge 60 is then passed through line 62 to a reslurry tank 63 wherein the temperature of the product is raised to approximately 100–125° F., thereby melting a portion of the slurry and increasing the durene content of the remaining crystals in known fashion. From the reslurry tank 63 the product is then passed via line 64 to centrifuge 65 wherein the crystals are again separated from the liquid fraction, with the latter being returned via lines 66 and 55 to the crystallization unit 56, while the remaining crystals are still further purified by passage through line 67 into a second reslurry tank 68 where the temperature of the product is brought up to approximately 130–150° F. The product from tank 68 is passed through line 69 to centrifuge 70 from which the liquid portion of the product is returned through line 71 to reslurry tank 63, while the desired product, constituting approximately 95% by weight durene, is discharged at a rate of approximately 123,360 lbs./day through line 72. This represents a conversion to durene, based on fresh feed as supplied through line 10, of approximately 41%, with the remainder of the feed being converted to a high quality gasoline product, as recovered through line 45. The hydrogen consumption, during the reaction, is between 500 and 600 s.c.f. per barrel of reactor feed.

EXAMPLE II

In another operation, the $C_9$ feed concentrate of Example I is passed, without recycle feed, through the molybdenum oxide-on-silica-alumina catalyst of that example, along with 5850 s.c.f. of recycle gas (containing 90% hydrogen), per barrel of feed, at a temperature of 800° F., pressure of 1200 p.s.i.g., and a space rate of 1 v./v./hr., the catalyst having been employed for a period of 41 hours, under similar service conditions, before making the present run. The effluent from the reactor was collected over the period of the run (approximately 8 hours) and then analyzed, with the results presented in Table I below.

*Table I*

PRODUCTION OF DURENE FROM $C_9$ AROMATICS
[Once-through operation]

| Feed: | Vol. percent |
|---|---|
| Ethyl toluene | 8 |
| Mesitylene | 12 |
| Pseudocumene | 74 |
| Hemimellitene | 6 |
| Liquid yield (percent of feed) | 98 |

Liquid product: Vol. percent based on each fraction $C_6$ fraction (0.2%), $C_7$ fraction (9.8%)—
- Toluene ............................................. 57
- Nonaromatics ..................................... 43

$C_8$ fraction (26.0%)—
- Ethyl benzene .................................... 1.5
- o-Xylene ........................................... 21.2
- m-Xylene ........................................... 50.0
- p-Xylene ............................................ 21.6
- Nonaromatics ..................................... 5.7

$C_9$ fraction (41.3%)—
- Mesitylene .......................................... 27.0
- Pseudocumene ..................................... 74.7
- Hemimellitene ..................................... 5.8
- Nonaromatics ..................................... 2.5
- Other $C_9$'s (propyl benzenes and ethyl toluenes) ........................................ Trace $C_{10}$ fraction (19.7%)—
- Isodurene ........................................... 60
- Durene ................................................ 30
- Prehnitene .......................................... 3
- Nonaromatics ..................................... 7

$C_{11+}$ fractions (3%).

Note the variety of new polymethyl benzenes formed, any one of which may be recovered by known means and the remainder recycled as desired. Similar ethyl structures are obtained if the feed is predominantly polyethyl benzenes.

While information has been given above as to suitable feed stocks for employment in the present invention, with additional data being presented in the examples to follow, as regards particular stocks, it may be noted that good results can be obtained with normally liquid hydrocarbon refinery streams containing at least 30% by volume of polyalkyl-substituted benzenes wherein the alkyl substituent groups each contain from about 1 to 3 carbon atoms. When durene is the desired end product (along with gasoline), a particularly suitable feed stock coming within this preferred category is comprised of predominantly a $C_9$ fraction (whether freed of nonaromatic components or not) as obtained from a catalytic reformate, with good, though somewhat less favorable results as concerns production of durene, also being obtained with predominantly $C_8$–$C_{10}$ fractions of similar origin as illustrated by the feed streams shown in Example III below.

Whatever the nature of the feed stream employed, the same should be relatively low in nitrogen if poisoning of the catalyst is to be avoided. In general, the stock employed should contain less than 200 p.p.m. of nitrogen and preferably less than 50 p.p.m., it being recognized that this specification is somewhat flexible, since higher nitrogen contents such as those approaching or even exceeding 200 p.p.m. can be tolerated with heavier stocks than with those boiling essentialy in the gasoline range. In conventional refinery practice, however, the products obtained from catalytic reforming operations are low enough in nitrogen to meet the foregoing specifications. In the case of stocks which are not already sufficiently low in nitrogen, acceptable levels can be reached by pretreating the feed with hydrogen in the presence of a suitable catalyst as taught in the art.

EXAMPLE III

In this operation the recycle process of Example I is repeated with a $C_{8+}$ fraction (feed A below) and with a $C_{7+}$ fraction (feed B below) as obtained from catalytic reforming operations utilizing naphtha feed streams. In Table II below, the percentages given for the individual components of the fed are on an over-all volume basis.

Table II

Feed A: Percent
- $C_8$ components (25%)—
  - Ethyl benzene ................................. 1.3
  - Xylenes ............................................ 8.3
  - Nonaromatics .................................. 15.4
- $C_9$ components (66.5%)—
  - Propyl benzene ................................ 0.8
  - Ethyl toluenes ................................. 12.5
  - Hemimellitene ................................. 3.7
  - Pseudocumene ................................. 8.6
  - Mesitylene ...................................... 2.7
  - Nonaromatics .................................. 38.2
- $C_{10}$ components (7.3%)—
  - Ethyl xylenes .................................. 4.2
  - Isodurene ........................................ 0.8
  - Durene ............................................ 0.3
  - Prehnitene ...................................... 0.1
  - Nonaromatics .................................. 1.9
- $C_{11+}$ components (1.2%).

Feed B: Percent
- $C_7$ components (10.2%).
- $C_8$ components (23.7%)—
  - Ethyl benzene ................................. 1.1
  - Xylenes ............................................ 6.1
  - Nonaromatics .................................. 16.5
- $C_9$ components (40.7%)—
  - Propyl benzenes .............................. 1.2
  - Ethyl toluene .................................. 7.3
  - Hemimellitene ................................. 3.1
  - Pseudocumene ................................. 8.9
  - Mesitylene ...................................... 1.9
  - Nonaromatics .................................. 18.3
- $C_{10}$ components (16.9%)—
  - Ethyl xylenes .................................. 9.8
  - Isodurene ........................................ 2.1
  - Durene ............................................ 1.3
  - Prehnitene ...................................... 0.1
  - Nonaromatics .................................. 3.6
- $C_{11}$ components (5.1%).
- $C_{12}$ components (3.4%).

Due to the fact that the above feeds contain more than 50% of non aromatic and essentially nondurene precursors, the ultimate yield of durene is lower than the value reported in Example I. However, by carefully recycling the effluent compounds from reactor 15 until the same are recovered either as durene or as a desired gasoline fraction, it is still possible to recover in the vicinity of 15 lbs. of durene for each 100 lbs. of fresh feed charged.

We claim:

1. A method for converting polyalkyl benzenes containing from 9 to 10 carbon atoms in the molecule to durene, which comprises contacting a hydrocarbon feed containing said polyalkyl benzenes with a catalyst having a hydrogenating-dehydrogenating component disposed on an active cracking catalyst support in the presence of from about 1000 to 10,000 s.c.f. $H_2$ per barrel of feed at a temperature between about 650 and 850° F., a pressure above 300 p.s.i.g. and a space rate of from about 0.5 to 15 v./v./hr., and recovering durene from the resulting reaction mixture.

2. The method of claim 1 wherein the hydrocarbon feed is comprised in major portion of a $C_9$ fraction from a catalyic reformate.

3. The method for converting pseudocumene to durene, which comprises contacting said pseudocumene, along with hydrogen, with a catalyst having a hydrogenating-dehydrogenating component disposed on an active cracking support at a temperature between about 650 and 850° F. and a pressure above 300 p.s.i.g., and recovering durene from the resulting reaction mixture.

4. The method of claim 3 wherein the catalyst comprises molybdenum oxide deposited on a silica-alumina support.

5. A method for converting to durene and light gasoline a normally liquid hydrocarbon feed containing at least 30 vol. % of $C_9$ polyalkyl benzenes wherein the alkyl substitution groups each contain from about 1 to 3 carbon atoms, which comprises contacting the feed in a reaction zone, along with from about 1000 to 10,000 s.c.f. $H_2$ per barrel of total feed to said zone, with a catalyst having a hydrogenating-dehydrogenating component disposed on an active cracking catalyst support at a temperature between about 650 and 850° F., a pressure above 300 p.s.i.g. and a space rate between about 0.5 and 15 v./v./hr.; freeing the resulting catalytic reaction product of hydrogen and other normally gaseous components in a gas-liquid separating zone; separating the remaining, normally liquid portion in a first fractionation zone into a light gasoline fraction which is substantially free of $C_{10}$ and heavier components, and a heavy fraction which contains said components; separating said heavy fraction in a second fractionating zone into a light, durene-containing fraction and a heavy fraction comprising $C_{11}$ and higher components; recovering durene as product from said durene-containing fraction; and returning to the reaction zone as recycle feed the remainder of said durene-containing fraction, including non-recovered durene, as well as the heavy fraction obtained from said second fractionation zone.

6. The method of claim 5 wherein the catalyst comprises molybdenum oxide deposited on a silica-alumina support.

7. The method of claim 5 wherein the light gasoline fraction recovered from the first fractionation zone is separated into a light, product gasoline fraction which is substantially free of $C_8$ and heavier components and a heavy fraction which contains said components, and wherein said heavy fraction is returned as recycle feed to the reaction zone.

8. The method of claim 7 wherein the feed is comprised in major portion of a $C_9$ fraction from a catalytic reformate.

9. The method of claim 7 wherein the catalyst comprises molybdenum oxide on a silica-alumina support, and wherein the feed is comprised in major portion of trimethyl benzenes.

References Cited in the file of this patent

UNITED STATES PATENTS

| | | |
|---|---|---|
| 2,576,261 | Fetterly | July 24, 1956 |

FOREIGN PATENTS

| | | |
|---|---|---|
| 1,059,336 | France | Nov. 10, 1953 |
| 1,082,941 | France | June 23, 1954 |